(12) United States Patent
Zhao et al.

(10) Patent No.: US 11,553,574 B2
(45) Date of Patent: Jan. 10, 2023

(54) LIGHTING APPARATUS

(71) Applicant: XIAMEN LEEDARSON LIGHTING CO., LTD, Fujian (CN)

(72) Inventors: Fanglei Zhao, Fujian (CN); Youqin Lin, Fujian (CN); Zhixian Wu, Fujian (CN); Renhua Zou, Fujian (CN); Yun Wang, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/377,176

(22) Filed: Jul. 15, 2021

(65) Prior Publication Data
US 2022/0022298 A1 Jan. 20, 2022

(30) Foreign Application Priority Data
Jul. 20, 2020 (CN) .......................... 202021433496.9

(51) Int. Cl.
| H05B 47/10 | (2020.01) |
| F21K 9/238 | (2016.01) |
| F21V 23/00 | (2015.01) |
| F21V 29/70 | (2015.01) |
| H01Q 1/44 | (2006.01) |
| F21Y 115/10 | (2016.01) |

(52) U.S. Cl.
CPC ............. *H05B 47/10* (2020.01); *F21K 9/238* (2016.08); *F21V 23/003* (2013.01); *F21V 29/70* (2015.01); *H01Q 1/44* (2013.01); *F21Y 2115/10* (2016.08)

(58) Field of Classification Search
None
See application file for complete search history.

(56) References Cited

U.S. PATENT DOCUMENTS

2016/0329624 A1* 11/2016 Chen ...................... F21K 9/237

FOREIGN PATENT DOCUMENTS

| WO | WO-2014173852 A1 * 10/2014 | ............ F21V 23/045 |
| WO | WO-2018158096 A1 * 9/2018 | ............. F21K 9/232 |

* cited by examiner

*Primary Examiner* — Anh Q Tran
(74) *Attorney, Agent, or Firm* — Chun-Ming Shih; Lanway IPR Services

(57) ABSTRACT

A lighting apparatus includes a LED module, a light source plate, a heat sink, an antenna, a driver and a light housing. The light source plate is used for holding the LED module. The heat sink has a bottom plate and a lateral wall. The light source plate is placed on the bottom plate. The antenna is disposed on the lateral wall. The driver is used for generating a driving current to the LED module. The driver has a wireless circuit. The wireless circuit is electrically connected to the antenna for transmitting a wireless signal. The light housing is used for holding the heat sink so that the LED module emits light toward a light opening of the light housing.

19 Claims, 6 Drawing Sheets

LIGHTING APPARATUS

FIELD

The present invention is related to a lighting apparatus, and more particularly related to a lighting apparatus with a flexible antenna.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to design a light device that has more useful functions. To activate and control such functions, the light device needs to have a controller responding to operation commands.

Wireless circuits may be used to achieve such goals. But, when a light device is installed, there may be shielding to affect signal quality, either by the structure of the light device or by a position of the light device.

Therefore, it is beneficial to design a light device that has a good signal quality while having a compact design.

SUMMARY

In some embodiments, a lighting apparatus includes a LED module, a light source plate, a heat sink, an antenna, a driver and a light housing.

The light source plate is used for holding the LED module.

The heat sink has a bottom plate and a lateral wall.

The light source plate is placed on the bottom plate.

The antenna is disposed on the lateral wall.

The driver is used for generating a driving current to the LED module.

The driver has a wireless circuit.

The wireless circuit is electrically connected to the antenna for transmitting a wireless signal.

The light housing is used for holding the heat sink so that the LED module emits light toward a light opening of the light housing.

In some embodiments, an antenna plug is disposed on a bottom side of the bottom plate for connecting to the driver.

The antenna is electrically connected to the driver via the antenna plug.

In some embodiments, the driver includes a control module and a current generator.

The control module has an antenna socket connecting to the antenna plug.

In some embodiments, there is a gap opening disposed on the lateral wall.

The gap opening is adjacent to the antenna.

In some embodiments, the gap opening has multiple turn portions.

In some embodiments, the lateral wall has a top portion and a bottom portion, the bottom portion is closer to the light source plate than the top portion.

The antenna is placed on the top portion.

In some embodiments, the antenna has a first antenna part and a second antenna part disposed on two sides of the lateral wall.

In some embodiments, the antenna has multiple antenna units placed on multiple positions of the lateral wall.

The driver selects one of the multiple antennas with a best signal quality.

In some embodiments, the antenna is plugged on an antenna socket disclosed on the lateral wall.

In some embodiments, the driver is placed on the light source plate.

The antenna is connected to the driver via a metal path of the light source plate.

In some embodiments, a wireless circuit is integrated with the antenna to be placed on the lateral wall.

In some embodiments, the light housing has a trumpet structure with a top trumpet part and a bottom trumpet part.

The top trumpet part has a larger diameter than the bottom trumpet part.

The lateral wall of the heat sink engages the top trumpet part.

In some embodiments, the lighting apparatus may also include a lens with a top lens edge engages the top trumpet part to press the light source plate to the bottom plate of the heat sink.

In some embodiments, the top lens edge is buckled to the top trumpet part.

In some embodiments, the lighting apparatus may also include a NFC tag disposed on the lens.

The NFC tag is electrically connected to a conductive path of the antenna to be connected to the driver.

In some embodiments, the top trumpet part is an electric insulator.

In some embodiments, an inner surface of the lateral wall has a reflective layer.

In some embodiments, a manual switch is mounted on the lateral wall of the heat sink.

The manual switch is connected to the driver and an operation portion of the manual switch is exposed outside the lighting apparatus to be operated by the user to adjust an output of the LED module.

In some embodiments, the antenna is integrated with the manual switch as an unit to be placed on the lateral wall.

In some embodiments, there is a gap distance between an edge of the light source plate and the lateral wall of the heat sink.

DETAILED DESCRIPTION

Figure 1:
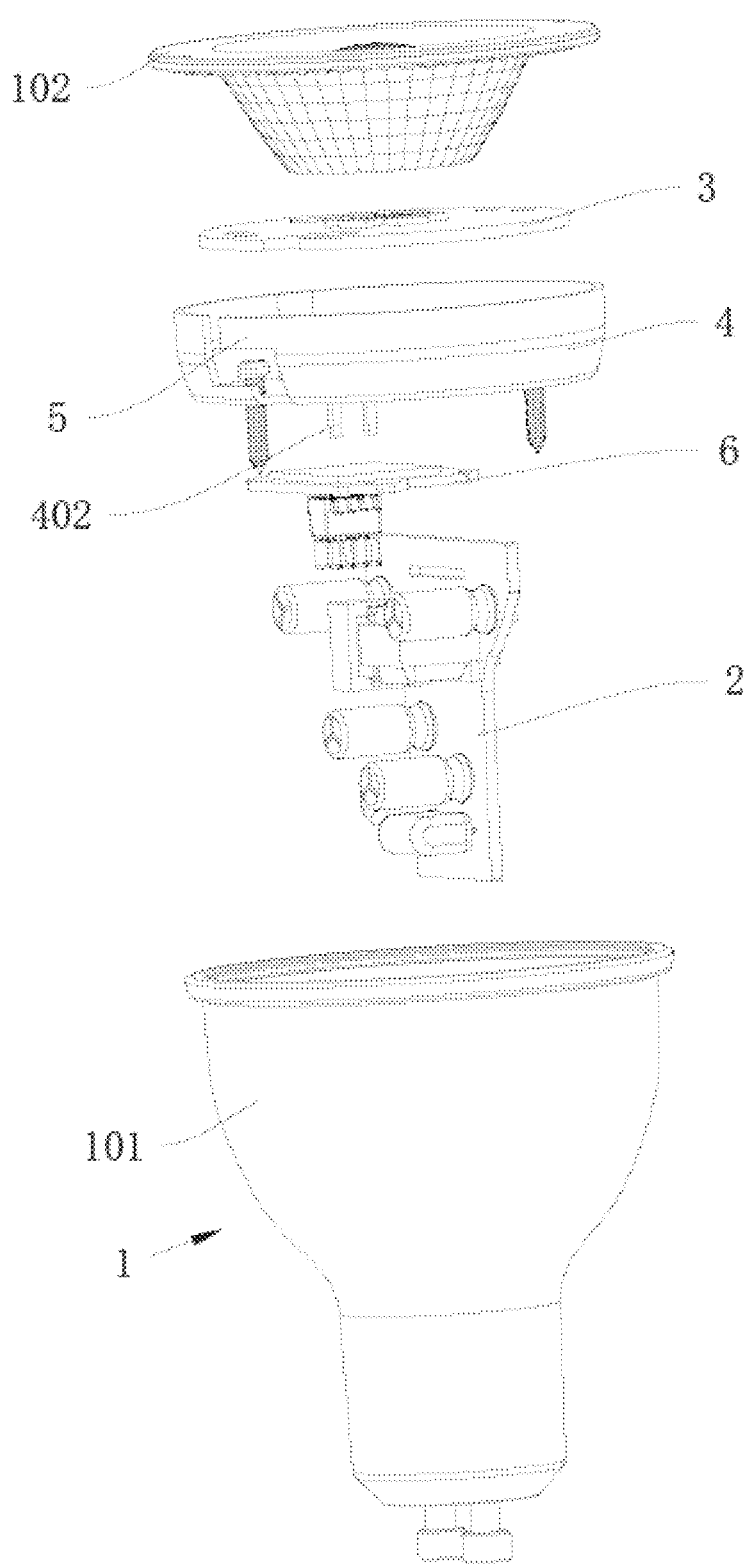
FIG. 1 illustrates an exploded view of a lighting apparatus embodiment.

In some embodiments, a lighting apparatus includes a LED module 607, a light source plate 606, a heat sink 622, an antenna 624, a driver 617 and a light housing 605.

The light source plate 606 is used for holding the LED module 607. The conductive path may be formed on the light source plate 606. In addition, an aluminum plate may be integrated for increasing heat dissipation.

The heat sink 622 has a bottom plate 623 and a lateral wall 621. The lateral wall 621 is surrounding the bottom plate 623, forming a container for holding the light source plate 606.

The light source plate 606 is placed on the bottom plate 623.

The antenna 624 is disposed on the lateral wall 621.

The driver 617 is used for generating a driving current from an external power source 619, like 110V AC power, to the LED module 607.

The driver 617 has a wireless circuit 616 which may be integrated with a control module with processors. The driver 617 may also has a current generator 615.

The wireless circuit 616 is electrically connected to the antenna for transmitting a wireless signal.

The light housing 605 is used for holding the heat sink 622 so that the LED module 607 emits light toward a light opening 60 of the light housing 608.

In some embodiments, an antenna plug 614 is disposed on a bottom side of the bottom plate 623 for connecting to the driver 617. The antenna plug 614 is connected to the antenna 624 via a conductive path 613.

The antenna 624 is electrically connected to the driver 617 via the antenna plug 614.

In some embodiments, the driver includes a control module and a current generator 615, as mentioned above.

The control module has an antenna socket 6141 connecting to the antenna plug 614.

Figure 2:
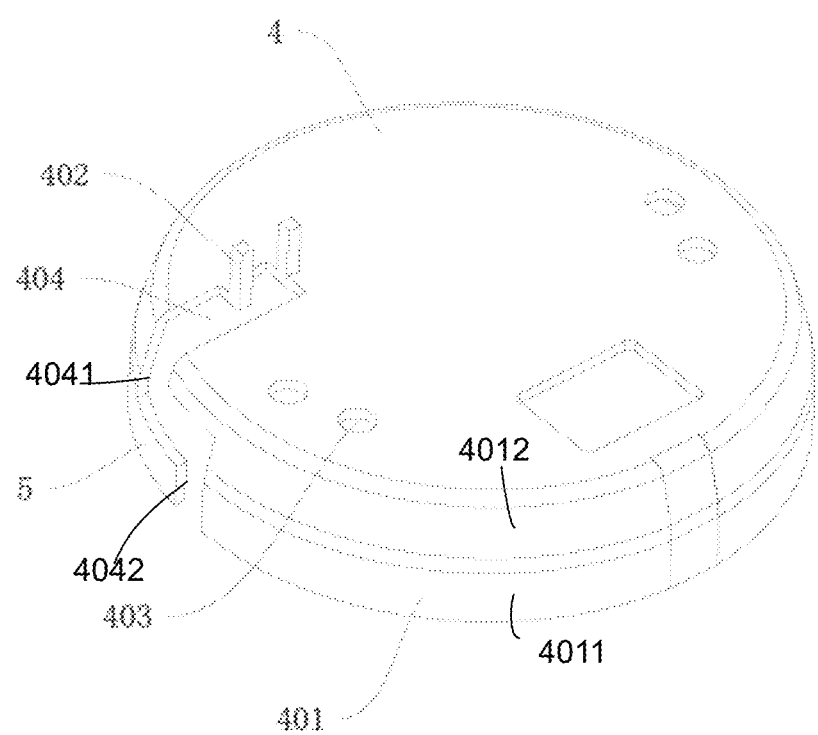
FIG. 2 illustrates an example of a heat sink with an antenna.

In FIG. 2, there is a gap opening 404 disposed on the lateral wall 401.

The gap opening 404 is adjacent to the antenna 5.

In some embodiments, the gap opening has multiple turn portions 4041, 4042. Such design enhances the strength of the lateral wall and also enhances signal quality of the antenna 5.

In some embodiments, the lateral wall has a top portion 4011 and a bottom portion 4012. The bottom portion 4012 is closer to the light source plate than the top portion 4011.

The antenna 5 is placed on the top portion 4011.

Figure 4:
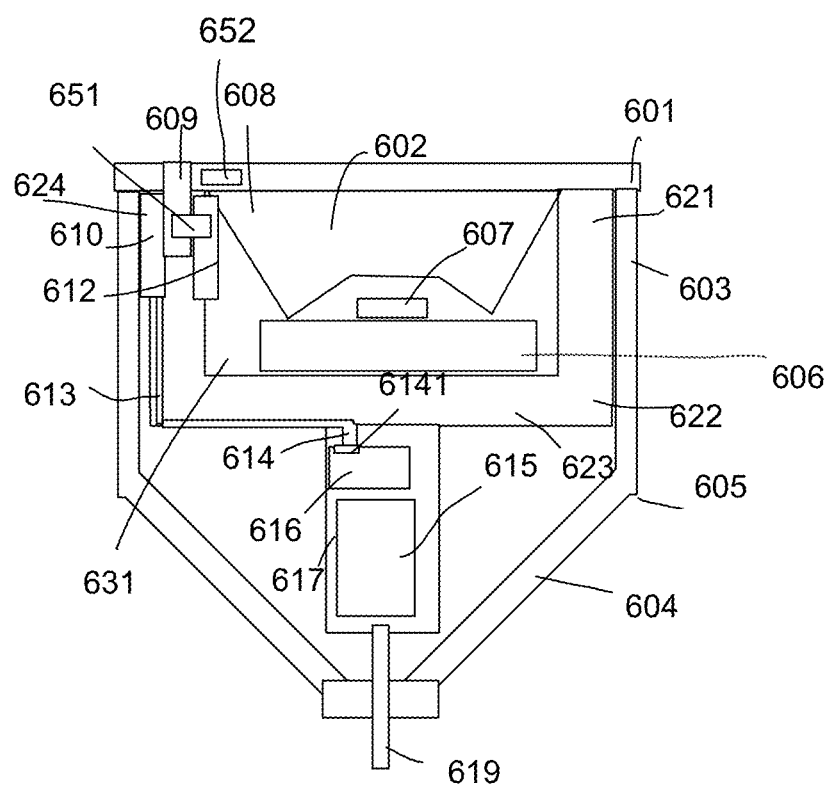
FIG. 4 shows another embodiment of a lighting apparatus.

In FIG. 4, the antenna 624 has a first antenna part 610 and a second antenna part 612 disposed on two sides of the lateral wall 622.

Figure 6:
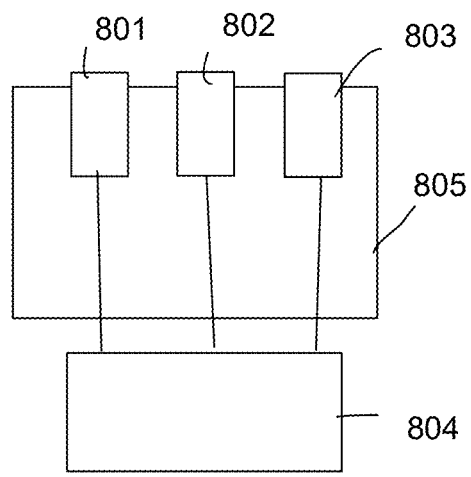
FIG. 6 shows multiple antenna parts for providing better signal quality.

In FIG. 6, the antenna has multiple antenna units 801, 802, 804 placed on multiple positions of the lateral wall 805.

The driver 804 selects one of the multiple antennas 801, 802, 803 with a best signal quality. In other words, the multiple antennas 801, 802, 803 may be placed on different positions of the lateral wall so that when the light device is installed on a platform and some antennas are shielded by obstacles, the driver 804 selects one or more antennas for receiving an transmitting signals.

Figure 5:
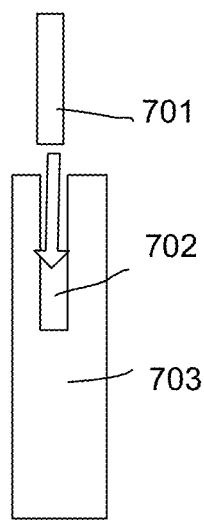
FIG. 5 shows an antenna socket on a lateral wall.

In FIG. 5, the antenna 701 is plugged on an antenna socket 702 disclosed on the lateral wall 703.

In some embodiments, the driver is placed on the light source plate. For example, the driver is attached on a back side of the light source plate, opposite to the LED module.

The antenna is connected to the driver via a metal path of the light source plate.

For example, FIG. 4 shows a conductive path 613 for connecting the antenna to the driver. The conductive path 613 may be placed on the light source plate.

In FIG. 4, a wireless circuit 651 is integrated with the antenna 624 to be placed on the lateral wall 621.

In some embodiments, the light housing 605 has a trumpet structure with a top trumpet part 603 and a bottom trumpet part 604.

The top trumpet part 603 has a larger diameter than the bottom trumpet part 604.

The lateral wall 621 of the heat sink engages the top trumpet part 603.

In some embodiments, the lighting apparatus may also include a lens 602 with a top lens edge 601 engages the top trumpet part 603 to press the light source plate 606 to the bottom plate 623 of the heat sink 622.

Figure 3:
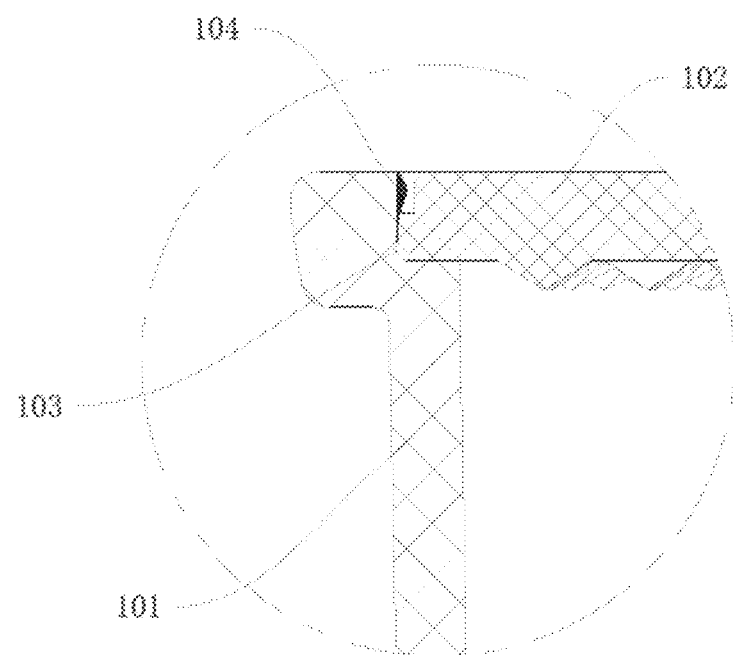
FIG. 3 illustrates a buckling connection of components in an embodiment.

In some embodiments, the top lens edge 601 is buckled to the top trumpet part 603, with a detailed example in FIG. 3.

In some embodiments, the lighting apparatus may also include a NFC tag 652 disposed on the lens 602.

The NFC tag 652 is electrically connected to a conductive path 613 of the antenna to be connected to the driver 617.

In some embodiments, the top trumpet part is an electric insulator.

In some embodiments, an inner surface of the lateral wall has a reflective layer.

In some embodiments, a manual switch 609 is mounted on the lateral wall of the heat sink.

The manual switch 609 is connected to the driver 617 and an operation portion of the manual switch 609 is exposed outside the lighting apparatus to be operated by the user to adjust an output of the LED module. For example, the exposed portion of the manual switch 609 may be a button or a slide switch for adjusting a color temperature of the LED module via controlling the driver 617.

In some embodiments, the antenna is integrated with the manual switch as an unit to be placed on the lateral wall.

In some embodiments, there is a gap distance 631 between an edge of the light source plate and the lateral wall 621 of the heat sink 622.

Please refer to FIG. 1. FIG. 1 shows an embodiment. In the embodiment, the lighting apparatus has a lens 102, a light source plate 3 mounted with LED modules, a heat sink 4 with an antenna 5 on a lateral wall of the heat sink 4, and a wireless circuit 6 connected to the antenna 5 via an antenna plug 402. The wireless circuit 6 is a part of the driver 2. There is a trumpet shape housing 101 for holding the components mentioned above forming a lighting apparatus 1.

FIG. 2 shows a heat sink 4. The heat sink 4 has an antenna plug 402 for connecting the antenna 5. The antenna 5 is placed on the lateral wall 401 of the heat sink 4.

FIG. 3 shows a buckling structure for the example in FIG. 1. The lens 102 has an edge 103 buckled with a top trumpet part 101 with a buckle structure 104.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a LED module;
a light source plate for holding the LED module;
a heat sink with a bottom plate and a lateral wall, wherein the light source plate is placed on the bottom plate;
an antenna disposed on the lateral wall;
a driver for generating a driving current to the LED module, wherein the driver has a wireless circuit, wherein the wireless circuit is electrically connected to the antenna for transmitting a wireless signal; and
a light housing for holding the heat sink so that the LED module emits light toward a light opening of the light housing, wherein an antenna plug is disposed on a bottom side of the bottom plate for connecting to the driver, wherein the antenna is electrically connected to the driver via the antenna plug.

2. The lighting apparatus of claim 1, wherein the driver comprises a control module and a current generator, wherein the control module has an antenna socket connecting to the antenna plug.

3. The lighting apparatus of claim 1, wherein there is a gap opening disposed on the lateral wall, wherein the gap opening is adjacent to the antenna.

4. The lighting apparatus of claim 3, wherein the gap opening has multiple turn portions.

5. The lighting apparatus of claim 1, wherein the lateral wall has a top portion and a bottom portion, the bottom portion is closer to the light source plate than the top portion, wherein the antenna is placed on the top portion.

6. The lighting apparatus of claim 1, wherein the antenna has a first antenna part and a second antenna part disposed on two sides of the lateral wall.

7. The lighting apparatus of claim 1, wherein the antenna has multiple antenna units placed on multiple positions of the lateral wall, wherein the driver selects one of the multiple antennas with a best signal quality.

8. The lighting apparatus of claim 1, wherein the antenna is plugged on an antenna socket disposed on the lateral wall.

9. The lighting apparatus of claim 1, wherein the driver is placed on the light source plate, wherein the antenna is connected to the driver via a metal path of the light source plate.

10. The lighting apparatus of claim 1, wherein a wireless circuit is integrated with the antenna to be placed on the lateral wall.

11. The lighting apparatus of claim 1, wherein the light housing has a trumpet structure with a top trumpet part and a bottom trumpet part, the top trumpet part has a larger diameter than the bottom trumpet part, the lateral wall of the heat sink engages the top trumpet part.

12. The lighting apparatus of claim 11, further comprising a lens with a top lens edge engages the top trumpet part to press the light source plate to the bottom plate of the heat sink.

13. The lighting apparatus of claim 12, wherein the top lens edge is buckled to the top trumpet part.

14. The lighting apparatus of claim 12, further comprising a NFC tag disposed on the lens, wherein the NFC tag is electrically connected to a conductive path of the antenna to be connected to the driver.

15. The lighting apparatus of claim 11, wherein the top trumpet part is an electric insulator.

16. The lighting apparatus of claim 1, wherein an inner surface of the lateral wall has a reflective layer.

17. The lighting apparatus of claim 1, wherein a manual switch is mounted on the lateral wall of the heat sink, wherein the manual switch is connected to the driver and an operation portion of the manual switch is exposed outside the lighting apparatus to be operated by the user to adjust an output of the LED module.

18. The lighting apparatus of claim 17, wherein the antenna is integrated with the manual switch as an unit to be placed on the lateral wall.

19. The lighting apparatus of claim 1, wherein there is a gap distance between an edge of the light source plate and the lateral wall of the heat sink.

* * * * *